(12) United States Patent
Li et al.

(10) Patent No.: US 12,211,304 B2
(45) Date of Patent: Jan. 28, 2025

(54) METHOD AND APPARATUS FOR PERFORMING STRUCTURED EXTRACTION ON TEXT, DEVICE AND STORAGE MEDIUM

(71) Applicant: Beijing Baidu Netcom Science and Technology Co., Ltd., Beijing (CN)

(72) Inventors: Yulin Li, Beijing (CN); Xiameng Qin, Beijing (CN); Chengquan Zhang, Beijing (CN); Junyu Han, Beijing (CN); Errui Ding, Beijing (CN); Tian Wu, Beijing (CN); Haifeng Wang, Beijing (CN)

(73) Assignee: Beijing Baidu Netcom Science and Technology Co., Ltd., Beijing (CN)

(*) Notice: Subject to any disclaimer, the term of this patent is extended or adjusted under 35 U.S.C. 154(b) by 993 days.

(21) Appl. No.: 17/200,448

(22) Filed: Mar. 12, 2021

(65) Prior Publication Data

US 2021/0201182 A1 Jul. 1, 2021

(30) Foreign Application Priority Data

Sep. 29, 2020 (CN) .......................... 202011049097.7

(51) Int. Cl.
*G06F 16/901* (2019.01)
*G06N 3/047* (2023.01)
(Continued)

(52) U.S. Cl.
CPC ........ *G06V 30/414* (2022.01); *G06F 16/9024* (2019.01); *G06N 3/047* (2023.01);
(Continued)

(58) Field of Classification Search
CPC .... G06V 30/414; G06V 10/22; G06V 10/806; G06F 16/9024; G06N 5/04
See application file for complete search history.

(56) References Cited

U.S. PATENT DOCUMENTS

| 2011/0320930 | A1 | 12/2011 | Liang et al. |
| 2018/0357259 | A1 | 12/2018 | Jin et al. |
| 2021/0295101 | A1* | 9/2021 | Tang ..................... G06N 3/045 |

FOREIGN PATENT DOCUMENTS

| CN | 101504781 A | 8/2009 |
| CN | 108614898 A | 10/2018 |

(Continued)

OTHER PUBLICATIONS

Zhang, Honggang, et al. "Text extraction from natural scene image: A survey." (Year: 2013).*

(Continued)

*Primary Examiner* — Oluwatosin Alabi
*Assistant Examiner* — Matiyas T Maru
(74) *Attorney, Agent, or Firm* — Kilpatrick Townsend & Stockton LLP (57) ABSTRACT

Embodiments of the present disclosure provide a method and apparatus for performing a structured extraction on a text, a device and a storage medium. The method may include: performing a text detection on an entity text image to obtain a position and content of a text line of the entity text image; extracting multivariate information of the text line based on the position and the content of the text line; performing a feature fusion on the multivariate information of the text line to obtain a multimodal fusion feature of the text line; performing category and relationship reasoning based on the multimodal fusion feature of the text line to obtain a category and a relationship probability matrix of the text line; and constructing structured information of the entity text image based on the category and the relationship probability matrix of the text line.

15 Claims, 6 Drawing Sheets

(51) Int. Cl.
  *G06N 5/04*     (2023.01)
  *G06V 10/22*    (2022.01)
  *G06V 10/80*    (2022.01)
  *G06V 30/262*   (2022.01)
  *G06V 30/414*   (2022.01)
  *G06V 10/24*    (2022.01)

(52) U.S. Cl.
  CPC .............. *G06N 5/04* (2013.01); *G06V 10/22* (2022.01); *G06V 10/806* (2022.01); *G06V 30/274* (2022.01); *G06V 10/247* (2022.01)

(56) References Cited

FOREIGN PATENT DOCUMENTS

| | | | | |
|---|---|---|---|---|
| CN | 110046355 A | * | 4/2019 | ........... G06F 40/205 |
| CN | 109711464 A | | 5/2019 | |
| CN | 110209721 A | | 9/2019 | |
| CN | 110321918 A | | 10/2019 | |
| CN | 110609891 A | | 12/2019 | |
| CN | 111598093 A | | 8/2020 | |
| CN | 111626049 A | | 9/2020 | |
| CN | 111709339 A | | 9/2020 | |
| JP | 2014-153846 A | | 8/2014 | |
| JP | 2019-215647 A | | 12/2019 | |

OTHER PUBLICATIONS

Zhang, Xiangnan, Xinbo Gao, and Chunna Tian. "Text detection in natural scene images based on color prior guided MSER." (Year: 2018).*
Cai, Yitao, Huiyu Cai, and Xiaojun Wan. "Multi-modal sarcasm detection in twitter with hierarchical fusion model." (Year: 2019).*
Bartz, Christian, Haojin Yang, and Christoph Meinel. "STN-OCR: A single neural network for text detection and text recognition." (Year: 2017).*
Li, Yao, and Huchuan Lu. "Scene text detection via stroke width." (Year: 2012).*
Li, Liangcheng, et al. "An end-to-end ocr text re-organization sequence learning for rich-text detail image comprehension. " (Year: 2020).*
Asri et a.,. "A sequence-to-sequence model for user simulation in spoken dialogue systems." (Year: 2016).*
Nallapati et al., "Sequence-to-sequence rnns for text summarization." (Year: 2016).*
Anonymous, "IMAQ TransformROI VI-NI Vision 2019 for LabVIEW Help—National Instruments," https://zone.ni.com/reference/en-XX/help/370281AG-01/imaqvision/imaq-transformroi/ (Mar. 2, 2019).
Anonymous, "Gated recurrent unit—Wikipedia," https://en.wikipedia.org/w/index.php?title=Gated_recurrent_unit&oldid=832718321 (Mar. 27, 2018).
Extended European Search Report dated Sep. 7, 2021 in related European Patent Application No. 21162002.6 (twelve pages).

* cited by examiner

METHOD AND APPARATUS FOR PERFORMING STRUCTURED EXTRACTION ON TEXT, DEVICE AND STORAGE MEDIUM

CROSS-REFERENCE TO RELATED APPLICATIONS

This application claims priority to Chinese Patent Application No. 202011049097.7, filed on Sep. 29, 2020, titled "Method and apparatus for performing structured extraction on text, device and storage medium," which is hereby incorporated by reference in its entirety.

TECHNICAL FIELD

Embodiments of the present disclosure relate to the field of computer technology, and specifically to the field of artificial intelligence such as computer vision, deep learning, and natural language processing.

BACKGROUND

In modern society, in order to accelerate the efficiency of information circulation and transmission, a structured text becomes a mainstream information carrier in daily production instead of the natural language, and is widely used in digital and automated office procedures. Although the achievements of global information digitization are becoming more and more significant, there are still a large number of entity documents in life that need to be recorded, reviewed and digitized. For example, in a financial department, every day, there are a large number of entity bills that are manually entered a plurality of times for reimbursement. In a bank, there are also many personal businesses in which the registration of an identity card is required to bind identity information. With the help of an OCR (optical character recognition) technology, people may recognize and digitize an entity text. These unstructured texts are further processed into storable structured texts, and thus, a structured information extraction for the texts is implemented, and office intelligence of an enterprise is supported, thereby promoting the progress of information digitization.

SUMMARY

Embodiments of the present disclosure propose a method and apparatus for performing a structured extraction on a text, a device and a storage medium.

In a first aspect, an embodiment of the present disclosure provides a method for performing a structured extraction on a text, including: performing a text detection on an entity text image to obtain a position and content of a text line of the entity text image; extracting multivariate information of the text line based on the position and the content of the text line; performing a feature fusion on the multivariate information of the text line to obtain a multimodal fusion feature of the text line; performing category and relationship reasoning based on the multimodal fusion feature of the text line to obtain a category and a relationship probability matrix of the text line; and constructing structured information of the entity text image based on the category and the relationship probability matrix of the text line.

In a second aspect, an embodiment of the present disclosure provides an apparatus for performing a structured extraction on a text, including: a detecting module, configured to perform a text detection on an entity text image to obtain a position and content of a text line of the entity text image; an extracting module, configured to extract multivariate information of the text line based on the position and the content of the text line; a fusing module, configured to perform a feature fusion on the multivariate information of the text line to obtain a multimodal fusion feature of the text line; a reasoning module, configured to perform category and relationship reasoning based on the multimodal fusion feature of the text line to obtain a category and a relationship probability matrix of the text line; and a constructing module, configured to construct structured information of the entity text image based on the category and the relationship probability matrix of the text line.

In a third aspect, an embodiment of the present disclosure provides an electronic device, including: at least one processor; and a storage device communicated with the at least one processor. The storage device stores an instruction executable by the at least one processor, and the instruction when executed by the at least one processor, causes the at least one processor to perform the method according to any implementation in the first aspect.

In a fourth aspect, an embodiment of the present disclosure provides a non-transitory computer readable storage medium storing a computer instruction. The computer instruction is used to cause a computer to perform the method according to any implementation in the first aspect.

It should be understood that the content described in this section is not intended to identify key or important features of the embodiments of the present disclosure, and is not used to limit the scope of the present disclosure. Other features of the present disclosure will be easily understood through the following description.

BRIEF DESCRIPTION OF THE DRAWINGS

After reading detailed descriptions for non-limiting embodiments given with reference to the following accompanying drawings, other features, objectives and advantages of the present disclosure will be more apparent. The accompanying drawings are used for a better understanding of the scheme, and do not constitute a limitation to the present disclosure.

DETAILED DESCRIPTION OF EMBODIMENTS

Example embodiments of the present disclosure are described below in combination with accompanying drawings, and various details of embodiments of the present disclosure are included in the description to facilitate understanding, and should be considered as examples only. Accordingly, it should be recognized by one of ordinary skill in the art that various changes and modifications may be made to the embodiments described herein without departing from the scope and spirit of the present disclosure. Also, for clarity and conciseness, descriptions for well-known functions and structures are omitted in the following description.

It should be noted that the embodiments in the present disclosure and the features in the embodiments may be combined with each other on a non-conflict basis. The present disclosure will be described below in detail with reference to the accompanying drawings and in combination with the embodiments.

Figure 1:
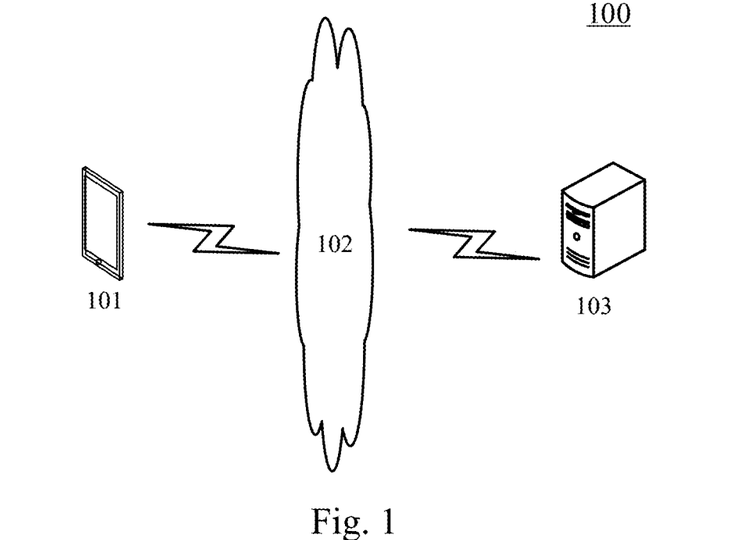
FIG. 1 illustrates an example system architecture in which some embodiments of the present disclosure may be applied.

FIG. 1 illustrates an example system architecture 100 in which a method for performing a structured extraction on a text or an apparatus for performing a structured extraction on a text according to embodiments of the present disclosure may be applied.

As shown in FIG. 1, the system architecture 100 may include a terminal device 101, a network 102, and a server 103. The network 102 serves as a medium providing a communication link between the terminal device 101 and the server 103. The network 102 may include various types of connections, for example, wired or wireless communication links, or optical fiber cables.

A user may interact with the server 103 via the network 102 by using the terminal device 101, to receive or send a message, etc. Various client applications (e.g., a document intelligent processing application, and an image processing application) may be installed on the terminal device 101.

The terminal device 101 may be hardware or software. When being the hardware, the terminal device 101 may be various electronic devices, including, but not limited to, a smart phone, a tablet computer, a laptop portable computer, a desktop computer and the like. When being the software, the terminal device 101 may be installed in the above listed electronic devices. The terminal device may be implemented as a plurality of pieces of software or a plurality of software modules, or as a single piece of software or a single software module, which will not be specifically defined here.

The server 103 may be a server providing various services. For example, the server 103 may perform processing such as an analysis on data such as an entity text image acquired from the terminal device 101, and generate a processing result (e.g., structured information).

It should be noted that the server 103 may be hardware or software. When the server 103 is the hardware, the server 103 may be implemented as a distributed server cluster composed of a plurality of servers, or as a single server. When the server 103 is the software, the server 103 may be implemented as a plurality of pieces of software or a plurality of software modules (e.g., software or software modules for providing a distributed service), or as a single piece of software or a single software module, which will not be specifically defined here.

It should be noted that the method for performing a structured extraction on a text provided by the embodiments of the present disclosure is generally performed by the server 103. Correspondingly, the apparatus for performing a structured extraction on a text is generally provided in the server 103.

It should be appreciated that the numbers of the terminal devices, the networks, and the servers in FIG. 1 are merely illustrative. Any numbers of terminal devices, networks, and servers may be provided based on actual requirements. In the situation where the server 103 stores the entity text image, the terminal device 101 and the network 102 may not be provided in the system architecture 100.

Figure 2:
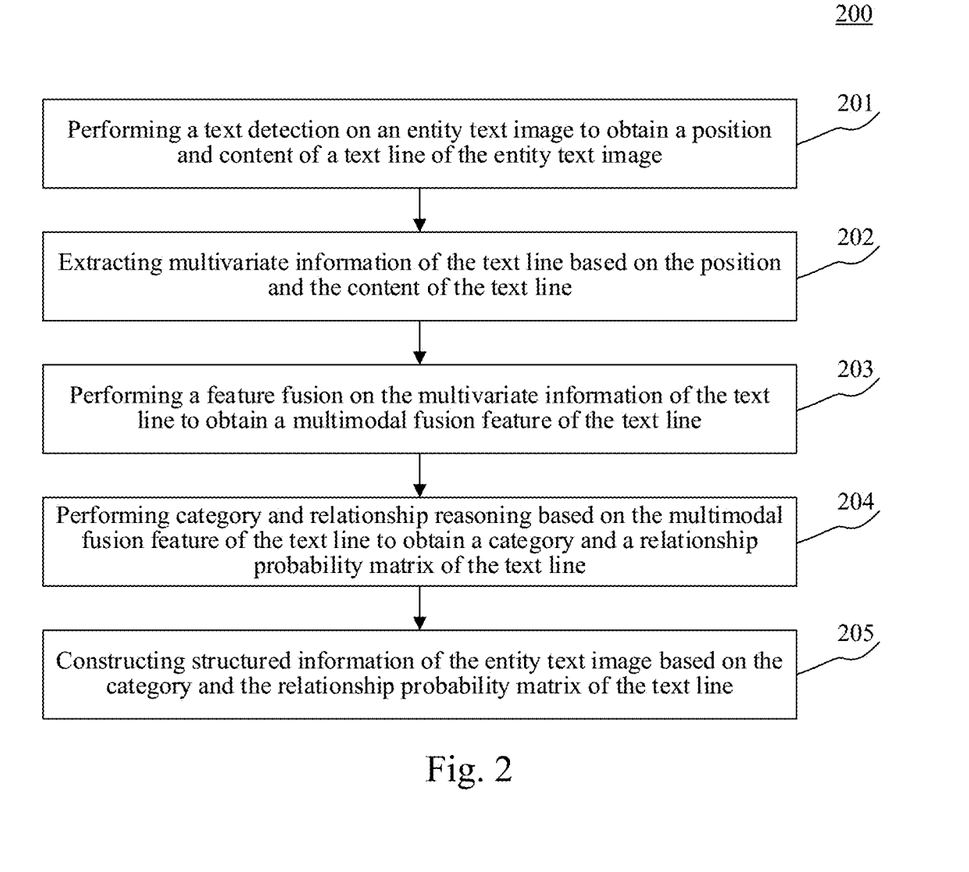
FIG. 2 is a flowchart of a method for performing a structured extraction on a text according to an embodiment of the present disclosure.

Further referring to FIG. 2, FIG. 2 illustrates a flow 200 of a method for performing a structured extraction on a text according to an embodiment of the present disclosure. The method for performing a structured extraction on a text includes the following steps.

Step 201, performing a text detection on an entity text image to obtain a position and content of a text line of the entity text image.

In this embodiment, an executing body (e.g., the server 103 shown in FIG. 1) of the method for performing a structured extraction on a text may acquire the entity text image, and perform the text detection on the entity text image using a text detection technology such as an OCR technology, to obtain the position and the content of the text line of the entity text image. Here, the entity text image may be an image obtained by capturing or scanning the entity text, and is commonly an image of various card certificates and bills. The text line may refer to a text region in the entity text image, the shape of which is generally quadrilateral. Therefore, the position of the text line may be generally represented by the coordinates of the four corner points thereof. The content of the text line may be text content.

Step 202, extracting multivariate information of the text line based on the position and the content of the text line.

In this embodiment, the executing body may extract the multivariate information of the text line based on the position and the content of the text line. Here, the multivariate information may include a plurality of kinds of information of the text line, for example, a geometric feature, a visual feature, and a semantic feature. The geometric feature and the visual feature are obtained based on the position of the text line. The geometric feature is used to represent the position of the text line. The visual feature is used to represent the image visual information of the text line. The semantic feature is obtained based on the content of the text line and is used to represent the meaning of the text line.

Step 203, performing a feature fusion on the multivariate information of the text line to obtain a multimodal fusion feature of the text line.

In this embodiment, the executing body may perform the feature fusion on the multivariate information of the text line to obtain the multimodal fusion feature of the text line. Here, the multimodal fusion feature includes the multivariate information of the text line at the same time, and is obtained by stitching the multivariate information of the text line.

Step 204, performing category and relationship reasoning based on the multimodal fusion feature of the text line to obtain a category and a relationship probability matrix of the text line.

In this embodiment, the above executing body may first determine the category and the relationship of the text line based on the multimodal fusion feature of the text line, and then perform the reasoning based on the category and the relationship of the text line to obtain the category and the relationship probability matrix of the text line. Here, the text line of the entity text image is generally divided into four categories: an attribute of a field, a value of the field, a header of a table, and a cell of the table. The relationship of the text line may be a relationship between any two text lines. The attribute and the value of the field may represent a field corresponding relationship. There is a one-to-one relationship between the attribute of the field and the value of the field. The header and the cell of the table may represent a table corresponding relationship. There is a one-to-many relationship between the header of the table and the cell of the table. The relationship probability matrix may be used to represent the probability that there is a relationship between two text lines.

Step 205, constructing structured information of the entity text image based on the category and the relationship probability matrix of the text line.

In this embodiment, the executing body may construct the structured information of the entity text image based on the category and the relationship probability matrix of the text line. Here, the structured information may represent the category of the text line and the relationship between the any two text lines. For example, rectangles of different colors are used to frame text lines of different categories, and straight lines of different colors are used to connect any two text lines having different relationships.

According to the method for performing a structured extraction on a text provided in the embodiment of the present disclosure, the text detection is first performed on the entity text image to obtain the position and the content of the text line of the entity text image. Then, the multivariate information of the text line is extracted based on the position and the content of the text line. Next, the feature fusion is performed on the multivariate information of the text line to obtain the multimodal fusion feature of the text line. Afterward, the category and relationship reasoning is performed based on the multimodal fusion feature of the text line to obtain the category and the relationship probability matrix of the text line. Finally, the structured information of the entity text image is constructed based on the category and the relationship probability matrix of the text line. A method for performing a structured extraction on a text based on category and relationship reasoning is provided, which is suitable for large-scale and automated processing and has a wide application range and a strong versatility.

For ease of understanding, the steps of the method for performing a structured extraction on a text that are provided in FIG. 2 are respectively described in detail below. It should be noted that the following decomposition method is only an example and is not specifically limited, and other feasible decomposition methods are also applicable.

Figure 3:
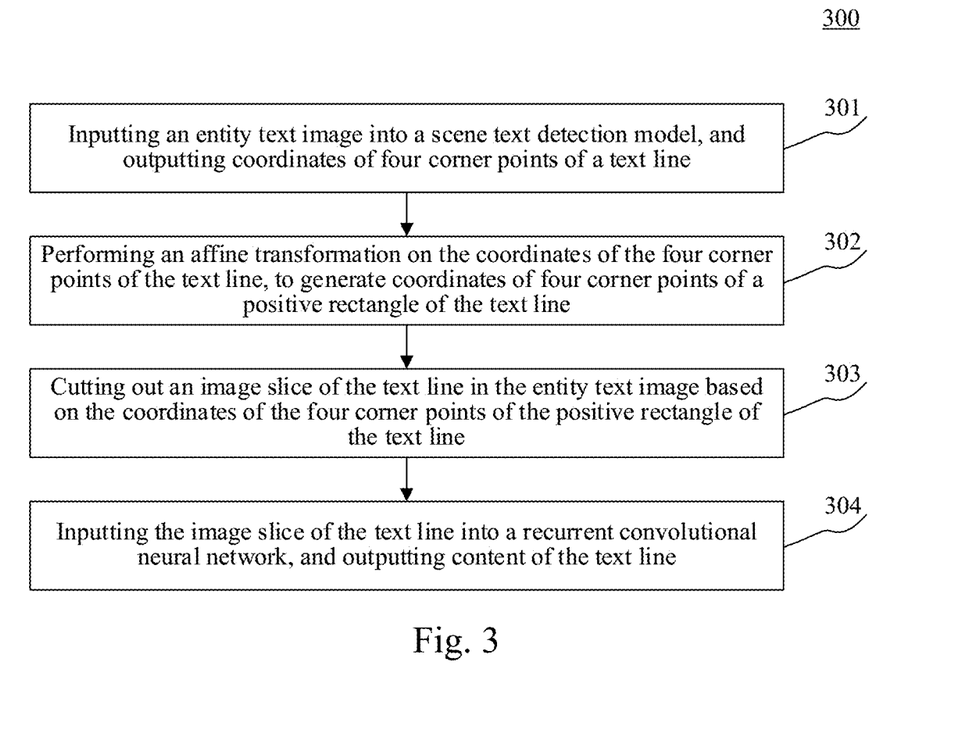
FIG. 3 is an exploded flow diagram of a text detection step in FIG. 2.

Further referring to FIG. 3, FIG. 3 illustrates an exploded flow 300 of the text detection step in FIG. 2. The text detection step may be exploded as follows.

Step 301, inputting an entity text image into a scene text detection model, and outputting coordinates of four corner points of a text line.

In this embodiment, the executing body may input the entity text image to the scene text detection model and output the coordinates of the four corner points of the text line.

Here, the scene text detection model may be, for example, an EAST (Efficient and Accuracy Scene Text detection pipeline), which can directly predict a text line having any direction and rectangular shape in the entity text image, and eliminate an unnecessary intermediate step such as candidate aggregation and word segmentation through a single neural network. The coordinates of the four corner points that are outputted by the EAST may be ordered in a clockwise direction. A set consisting of coordinates of four corner points of all text lines may be represented as $P=\{p_i; i \in N^*\}$. Here, four corner points of the $i^{th}$ text line may be represented as $p_i=\{(x_j, y_j); j \in (1,4)\}$.

Step 302, performing an affine transformation on the coordinates of the four corner points of the text line, to generate coordinates of four corner points of a positive rectangle of the text line.

In this embodiment, in order to continue to acquire the content of the text line, the executing body may perform the affine transformation on the coordinates of the four corner points of the text line, to eliminate the interference caused by the distortion and print offset of the entity text image and generate the coordinates of the four corner points of the positive rectangle of the text line. Here, for the coordinates $p_i$ of the four corner points of the $i^{th}$ text line, the coordinates of the four corner points of the positive rectangle of the $i^{th}$ text line may be represented as $\hat{p}_i$.

Step 303, cutting out an image slice of the text line in the entity text image based on the coordinates of the four corner points of the positive rectangle of the text line.

In this embodiment, the executing body may first search the points corresponding to the coordinates of the four corner points of the positive rectangle of the text line, and then the connecting line of the cut points enclose an ROI region (region of interest), and thus, the image slice of the text line may be obtained. Here, for the $i^{th}$ text line, an image slice of a corresponding region that is cut out in the entity text image based on the coordinates $\hat{p}_i$ of the four corner points of the positive rectangle of the text line may be represented as $l_i$.

Step 304, inputting the image slice of the text line into a recurrent convolutional neural network, and outputting content of the text line.

In this embodiment, the executing body may input the image slice of the text line into the RCNN (Recurrent Convolutional Neural Network) and output the content of the text line. Here, for the image slice $I_i$ of the $i^{th}$ text line, the content of the $i^{th}$ text line may be represented as $c_i$.

Here, the RCNN applies a CNN (convolutional neural network) method to a target detection problem, to implement the conversion of the target detection problem through a Region Proposal method and with the help of the good feature extraction and classification performance of the CNN. The RCNN may include steps such as a candidate region selection, a CNN feature extraction and classification, a boundary regression, and the like.

According to the method for detecting a text provided in the embodiment of the present disclosure, first, the entity text image is inputted into the scene text detection model, and the coordinates of the four corner points of the text line are outputted. Then, the affine transformation is performed on the coordinates of the four corner points of the text line, to generate the coordinates of the four corner points of the positive rectangle of the text line. Next, the image slice of the text line is cut out in the entity text image based on the coordinates of the four corner points of the positive rectangle of the text line. Finally, the image slice of the text line is inputted into the recurrent convolutional neural network, and the content of the text line is outputted. A method of acquiring the position and the content of the text line in the entity text image is provided. Moreover, before the content of the text line is acquired, the coordinates of the four corner points of the text line are affine-transformed into the coordinates of the four corner points of the positive rectangle, and thus, the interference caused by the distortion and print offset of the entity text image may be eliminated, thereby improving the accuracy of text detection.

In order to facilitate a structured analysis, the general relational structure of the entity text image may be predefined, thus giving a corresponding mathematical form.

Next, the relationship structure of the entity text image is predicted using a structured algorithm. Finally, a valid relationship structure is filtered out through the relationship definition, and structured information is outputted.

Generally, the entity text image is generally composed of a field and a table. In order to better analyze the layout structure of the entity text image, a structured text is divided into four categories: an attribute of a field, a value of the field, a header of a table, and a cell of the table. In addition, it is assumed that there is a corresponding relationship between the attribute and the value of the field, there is a corresponding relationship between the header and the cell of the table that are in the same column, and there is no other combination of relationships except the above. According to the above rule, the structure of the entity text image is defined as follows:

$$\begin{cases} R = \{(k_i, v_j); i, j \in N^*\} \\ M = \{h_i, c_j); i, j \in N^*\} \\ T = (K \cup V \cup H \cup C) \end{cases}$$

Here, R represents a set of corresponding relationships of a field and is represented using the attribute and the value of the field, M represents a set of corresponding relationships of a table and is represented using a header and a cell of the table, T represents an element set of all the four categories, and K, V, H and C respectively represent the attribute of the field, the value of the field, the header of the table, and the cell of the table.

Further, an undirected graph G=(V, E) is defined for the structure of the entity text image. Here, a vertex V=T, that is, the text line represents the vertex of the undirected graph, which is collectively referred to as a text line. A set of edges E=(R∪M), that is, the corresponding relationship of the field and the corresponding relationship of the table represent edges of the undirected graph. As can be seen from the definition of the undirected graph, $(v_i, v_j)=(v_j, v_i)$, $v_i$ is the $i^{th}$ text line, and $v_j$ is the $j^{th}$ text line (vertex).

Further, a two-dimensional relationship probability matrix $A \in N^2$; $A_{ij} \in \{0,1\}$ is constructed for E, which represents whether there is a relationship between corresponding text lines (vertices). Here, 1 represents that there is a relationship, and 0 represents that there is no relationship. Since G is an undirected graph, and A is a symmetric matrix, the relationship probability matrix is defined as follows:

$$A_{ij} = \begin{cases} 1 & \text{if } i \neq j \text{ and } (v_i, v_j) \in E \\ 0 & \text{otherwise} \end{cases}.$$

In summary, the structured form of the entity text image is defined as: V and A, and learned and predicted through a model algorithm in the subsequent process.

Figure 4:
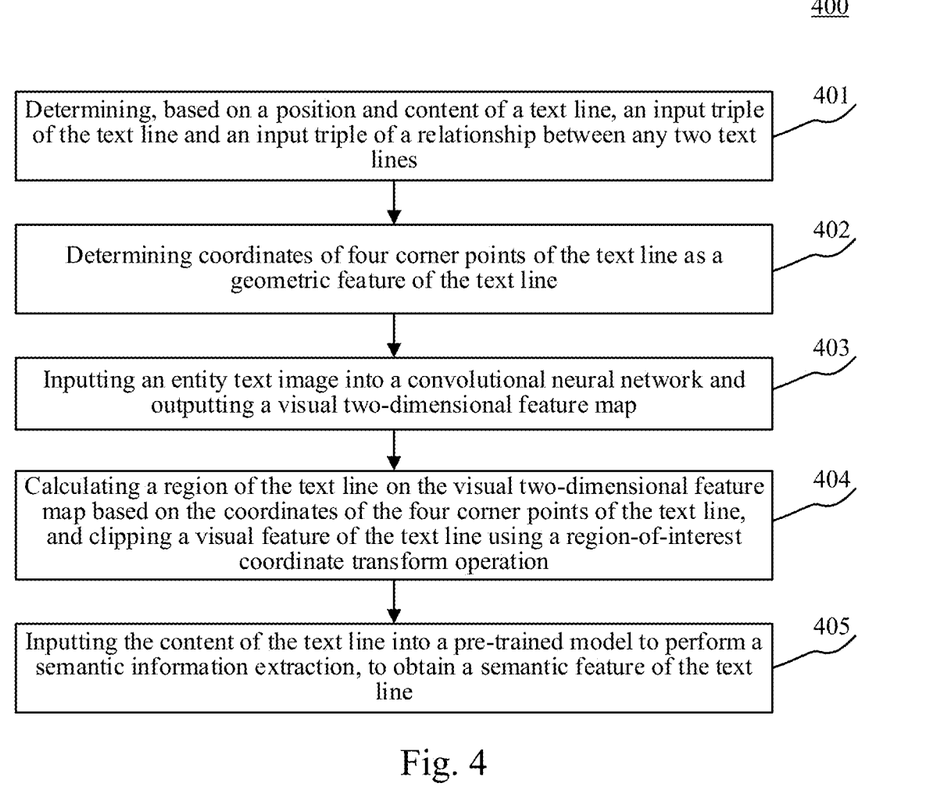
FIG. 4 is an exploded flow diagram of a multivariate information extraction step in FIG. 2.

Further referring to FIG. 4, FIG. 4 illustrates an exploded flow 400 of the multivariate information extraction step in FIG. 2. The multivariate information extraction step may be exploded as follows.

Step 401, determining, based on a position and content of a text line, an input triple of the text line and an input triple of a relationship between any two text lines.

In this embodiment, based on the position and the content of the text line, the executing body may determine the input triple of the text line and the input triple of the relationship between the any two text lines.

Here, the input triple of the text line may include coordinates of four corner points, the content and an image slice of the text line. The input triple of the relationship between the any two text lines may include a difference value between coordinates of four corner points of the any two text lines, an angle difference between center points of the any two text lines, and an Euclidean distance between the center points of the any two text lines.

An embodiment of the present disclosure proposes a graph-based deep learning algorithm. The category V and the relationship probability matrix A of the text line are predicted through a fusion of multivariate information. The input of the algorithm is determined based on the result of the text detection. Specifically, the input triple of each text line $v_i$ is defined as $(p_i, c_i, I_i)$, which includes coordinates of four corner points, content and an image slice of the text line. In addition, the input triple of the relationship $(v_i, v_j)$ between any two text lines is defined as $(d_{ij}, r_{ij}, u_{ij})$, the form of which is as follows:

$$\begin{cases} d_{ij} = p_i - p_j \\ r_{ij} = rot(p_i, p_j) \\ u_{ij} = \text{Euclidean}(p_i, p_j) \end{cases}.$$

Here, $d_{ij}$ is the difference value between the coordinates of the four corner points of the text line $v_i$ and the text line $v_j$ on the two-dimensional coordinates, $r_{ij}$ represents the angle difference between the center points of the text line $v_i$ and the text line $v_j$, $r \in [-\pi, \pi]$, and $e_{ij}$ represents the Euclidean distance between the center points of the text line $v_i$ and the text line $v_j$.

Next, the input triple of the text line and the input triple of the relationship between the any two text lines are used as an input of a multimodal feature extraction algorithm, to extract multivariate information of the text line, which is specifically shown in steps 402-405.

Step 402, determining coordinates of four corner points of the text line as a geometric feature of the text line.

In this embodiment, the executing body may determine the coordinates of the four corner points of the text line as the geometric feature of the text line. Here, for the $i^{th}$ text line $v_i$, the geometric feature thereof may be represented as $p_i$.

Step 403, inputting an entity text image into a convolutional neural network and outputting a visual two-dimensional feature map.

In this embodiment, the executing body may input the entity text image into the CNN, and the CNN performs a convolution operation on the entity text image to output the visual two-dimensional feature map.

Step 404, calculating a region of the text line on the visual two-dimensional feature map based on the coordinates of the four corner points of the text line, and clipping a visual feature of the text line using a region-of-interest coordinate transform operation.

In this embodiment, the executing body may first find, in the visual two-dimensional feature map, the points corresponding to the coordinates of the four corner points of the text line, to obtain a region enclosed by the connecting line of the points. Then, the executing body may clip the visual feature of the text line using the region-of-interest coordinate transform (TransformROI) operation. Here, for the $i^{th}$ text line $v_i$, the visual feature thereof may be represented as $(F_i)_v$.

Step 405, inputting the content of the text line into a pre-trained model to perform a semantic information extraction, to obtain a semantic feature of the text line.

In this embodiment, the executing body may input the content of the text line into the pre-trained model to perform the semantic information extraction, to obtain the semantic feature of the text line.

Here, the pre-trained model may be used for the semantic information extraction, for example, specifically for an ERNIE pre-trained under a certain knowledge area (e.g., bill, card certificate or legal contract document). The ERNIE is capable of fully representing the text line in terms of vocabulary, syntax, and semantics, to obtain a semantic feature of a high-level understanding. Thus, it is implemented that the generalized linguistic knowledge domain contained in the ERNIE is transferred to the text structure, such that the scene knowledge and the text semantics can be better understood. The understanding for the knowledge is enhanced through the ERNIE, and thus, the structured analysis for vertical categories such as bills, card certificates, documents and the like in various scenarios can be more easily solved. Here, for the $i^{th}$ text line $v_i$, the semantic feature obtained by performing the semantic information extraction on the content $c_i$ of text line may be represented as $(F_i)_s$.

Further, the executing body may perform multimodal stitching and fusion on the geometric feature, the visual feature and the semantic feature of the text line, to generate the multimodal feature of the text line. For the combination of the any two text lines, the multimodal features corresponding to the text lines and the input triple of the relationship between the any two text lines are stitched, to generate the relationship feature of the any two text lines, thereby providing a multivariate information fusion method. Here, for the $i^{th}$ text line $v_i$, the multimodal stitching and fusion is performed on the geometric feature $p_i$, the visual feature $(F_i)_v$ and the semantic feature $(F_i)_s$, to generate the multimodal feature $F_i$ of the text line. For the $i^{th}$ text line $v_i$ and a $j^{th}$ text line $v_j$, the relationship feature thereof may be represented as $E_{ij}=(F_i, F_j, d_{ij}, r_{ij}, u_{ij})$.

Figure 5:
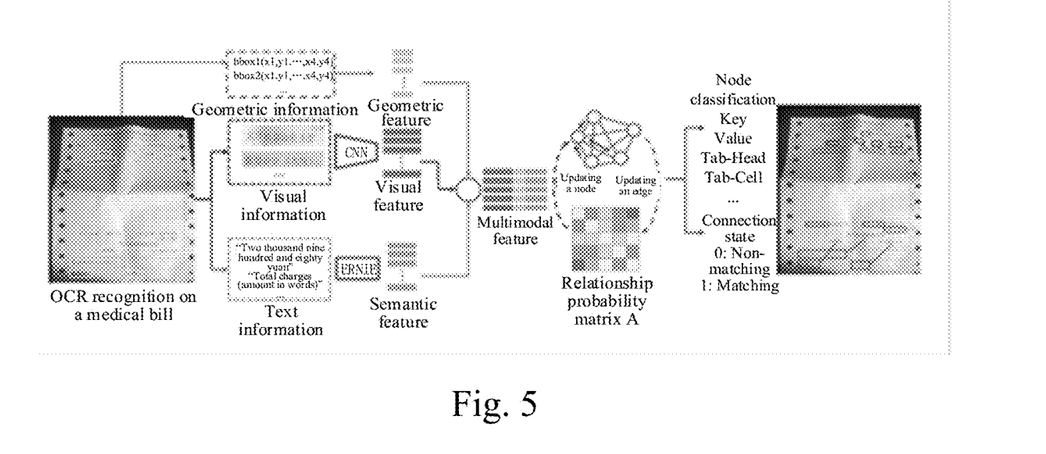
FIG. 5 is an application scenario of a multivariate information extraction.

Further referring to FIG. 5, FIG. 5 illustrates an application scenario of a multivariate information extraction. As shown in FIG. 5, an OCR recognition is performed on a medical bill to obtain geometric information, visual information, and text information. The geometric information may be directly used as a geometric feature, a visual feature can be obtained from the visual information through a CNN, and a semantic feature can be obtained from the text information through an ERNIE. A multimodal feature can be obtained by fusing the geometric feature, the visual feature and the semantic feature. A relationship probability matrix A can be obtained based on the multimodal feature. A node and an edge of an undirected graph are updated based on the relationship probability matrix A, and thus, the determination on a node classification and a connection state can be implemented.

According to the multivariate information extraction method provided in the embodiment of the present disclosure, based on the position and the content of the text line, the input triple of the text line and the input triple of the relationship between the any two text lines are first determined. Then, the coordinates of the four corner points of the text line are determined as the geometric feature of the text line. Next, the entity text image is inputted into the convolutional neural network and the visual two-dimensional feature map is outputted. The region of the text line on the visual two-dimensional feature map is calculated based on the coordinates of the four corner points of the text line, and the visual feature of the text line is clipped using the region-of-interest coordinate transform operation. Finally, the content of the text line is inputted into the pre-trained model to perform the semantic information extraction, to obtain the semantic feature of the text line. The multivariate information of the text line is extracted based on a deep learning method, thereby improving the efficiency and precision of the extraction for the multivariate information.

In practical application, the category and the relationship probability matrix of the text line may be calculated using a graph neural network. Based on a large-scale semantic learning model, a deep learning network is built to reason the distribution of a relationship between text lines.

Specifically, the multimodal feature of the text line and the relationship feature of the any two text lines are inputted into the graph neural network, and the category and the relationship probability matrix of the text line are outputted. The category and relationship reasoning is performed based on the graph neural network, and the category and relationship of the text line are automatically learned, thereby improving the learning efficiency.

Here, the structure of the graph neural network may be formed by stacking a plurality of identical graph neural network layers. For example, the graph neural network may include N graph neural network layers. At this time, for the $l^{th}$ layer of the graph neural network, the multimodal feature of the text line and the relationship feature of the any two text lines that are outputted from the $(l-1)^{th}$ layer are inputted into the $l^{th}$ layer, to obtain the multimodal feature of the text line and the relationship feature of the any two text lines that are outputted from the $l^{th}$ layer. Here, N is a positive integer, $1 \leq l < N$, and l is a positive integer.

Figure 6:
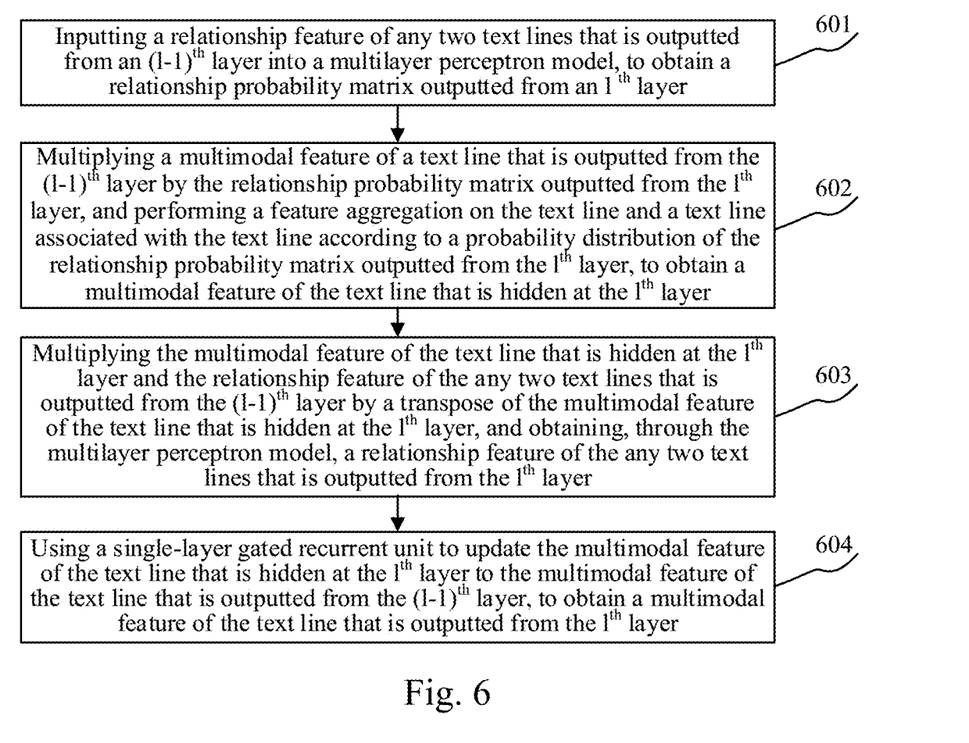
FIG. 6 is an exploded flow diagram of a category and relationship reasoning step in FIG. 2.

Further referring to FIG. 6, FIG. 6 illustrates an exploded flow 600 of the category and relationship reasoning step in FIG. 2. The category and relational reasoning step may be exploded as follows.

Step 601, inputting a relationship feature of any two text lines that is outputted from an $(l-1)^{th}$ layer into a multilayer perceptron model, to obtain a relationship probability matrix outputted from an $l^{th}$ layer.

In this embodiment, for the $l^{th}$ layer of a graph neural network, the input thereof is the multimodal feature F[l-1] of the text line and the relationship feature E[l-1] of the any two text lines that are outputted from the $(l-1)^{th}$ layer, and the output thereof is the multimodal feature F[l] of the text line and the relationship feature E[l] of the any two text lines.

Specifically, the executing body may input the relationship feature E[l-1] of the any two text lines that is outputted from the $(l-1)^{th}$ layer into the MLP (Multilayer Perceptron), to obtain the relationship probability matrix A[l] outputted from the $l^{th}$ layer. Here, the MLP is also called an artificial neural network (ANN). In addition to the input layer and the output layer, the MLP may have a plurality of hidden layers in the middle, and the simplest MLP contains only one hidden layer. The layers of the MLP are fully connected, i.e., any neuron in a previous layer is connected to all neurons in a next layer.

Step 602, multiplying a multimodal feature of a text line that is outputted from the $(l-1)^{th}$ layer by the relationship probability matrix outputted from the $l^{th}$ layer, and performing a feature aggregation on the text line and a text line associated with the text line according to a probability distribution of the relationship probability matrix outputted from the $l^{th}$ layer, to obtain a multimodal feature of the text line that is hidden at the $l^{th}$ layer.

In this embodiment, the executing body may multiply the multimodal feature F[l-1] of the text line that is outputted from the (l-1)$^{th}$ layer by the relationship probability matrix A[I] outputted from the l$^{th}$ layer, and perform the feature aggregation on the text line and the text line associated with the text line according to the probability distribution of the relationship probability matrix A[I] outputted from the l$^{th}$ layer, to obtain the multimodal feature H[I] of the text line that is hidden at the l$^{th}$ layer.

Step 603, multiplying the multimodal feature of the text line that is hidden at the l$^{th}$ layer and the relationship feature of the any two text lines that is outputted from the (l-1)$^{th}$ layer by a transpose of the multimodal feature of the text line that is hidden at the l$^{th}$ layer, and obtaining, through the multilayer perceptron model, a relationship feature of the any two text lines that is outputted from the l$^{th}$ layer.

In this embodiment, the above executing body may perform a three-term matrix multiplication on the multimodal feature H[l] of the text line that is hidden at the l$^{th}$ layer, the relationship feature E[l-1] of the any two text lines that is outputted from the (l-1)$^{th}$ layer and the transpose of the multimodal feature H[I] of the text line that is hidden at the l$^{th}$ layer, and obtain, through the MLP, the relationship feature E[I] of the any two text lines that is outputted from the l$^{th}$ layer.

Step 604, using a single-layer gated recurrent unit to update the multimodal feature of the text line that is hidden at the l$^{th}$ layer to the multimodal feature of the text line that is outputted from the (l-1)$^{th}$ layer, to obtain a multimodal feature of the text line that is outputted from the l$^{th}$ layer.

In this embodiment, the executing body may use the single-layer GRU (gated recurrent unit) to update the multimodal feature H[l] of the text line that is hidden at the l$^{th}$ layer to the multimodal feature F[l-1] of the text line that is outputted from the (l-1)$^{th}$ layer, to obtain the multimodal feature F[I] of the text line that is outputted from the l$^{th}$ layer.

Here, if l=N, it indicates that the l$^{th}$ layer is the last layer of the graph neural network. Accordingly, the relationship probability matrix A[l] outputted from the l$^{th}$ layer is the relationship probability matrix A' of the text line, and the feature F[I] of the text line that is outputted from the l$^{th}$ layer is the category V' of the text line.

Figure 7:
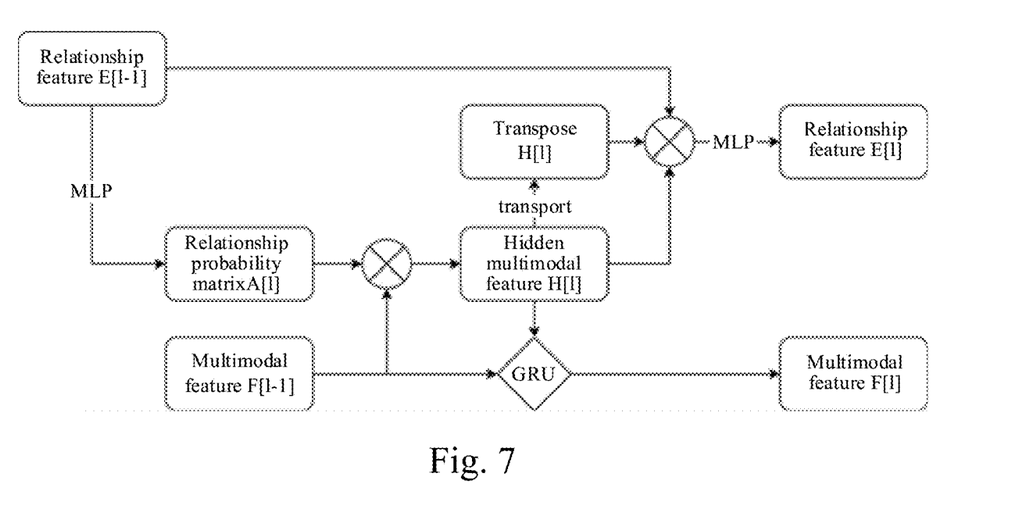
FIG. 7 is a structure diagram of a graph neural network layer.

Further referring to FIG. 7, FIG. 7 illustrates a structure diagram of a graph neural network layer. As shown in FIG. 7, the relationship feature E[l-1] of the any two text lines that is outputted from the (l-1)$^{th}$ layer is inputted into the MLP, to obtain the relationship probability matrix A[I] outputted from an l$^{th}$ layer. A matrix multiplication is performed on the multimodal feature F[l-1] of the text line that is outputted from the (l-1)$^{th}$ layer and the relationship probability matrix A[I] outputted from the l$^{th}$ layer, to obtain the multimodal feature H[I] of the text line that is hidden at the l$^{th}$ layer. The three-term matrix multiplication is performed on the multimodal feature H[l] of the text line that is hidden at the l$^{th}$ layer, the relationship feature E[l-1] of the any two text lines that is outputted from the (l-1)$^{th}$ layer and the transpose of the multimodal feature H[l] of the text line that is hidden at the l$^{th}$ layer. Through the MLP, the relationship feature E[1] of the any two text lines that is outputted from the l$^{th}$ layer is obtained. The single-layer GRU is used to update the multimodal feature H[l] of the text line that is hidden at the l$^{th}$ layer to the multimodal feature F[l-1] of the text line that is outputted from the (l-1)$^{th}$ layer, to obtain the multimodal feature F[l] of the text line that is outputted from the l$^{th}$ layer.

According to the category and relationship reasoning method provided in the embodiment of the present disclosure, the relationship feature of the any two text lines that is outputted from the (l-1)$^{th}$ layer is first inputted into the multilayer perceptron model, to obtain the relationship probability matrix outputted from the l$^{th}$ layer. Then, the multimodal feature of the text line that is outputted from the (l-1)$^{th}$ layer is multiplied by the relationship probability matrix outputted from the l$^{th}$ layer, and the feature aggregation is performed on the text line and the text line associated with the text line according to the probability distribution of the relationship probability matrix outputted from the l$^{th}$ layer, to obtain the multimodal feature of the text line that is hidden at the l$^{th}$ layer. Next, the multimodal feature of the text line that is hidden at the l$^{th}$ layer and the relationship feature of the any two text lines that is outputted from the (l-1)$^{th}$ layer are multiplied by the transpose of the multimodal feature of the text line that is hidden at the l$^{th}$ layer, and the relationship feature of the any two text lines that is outputted from the l$^{th}$ layer is obtained through the multilayer perceptron model. Finally, the single-layer gated recurrent unit is used to update the multimodal feature of the text line that is hidden at the l$^{th}$ layer to the multimodal feature of the text line that is outputted from the (l-1)$^{th}$ layer, to obtain the multimodal feature of the text line that is outputted from the l$^{th}$ layer. The category and relationship reasoning is performed based on the graph neural network, and the category and relationship of the text line are automatically learned, thereby improving the learning efficiency.

Figure 8:
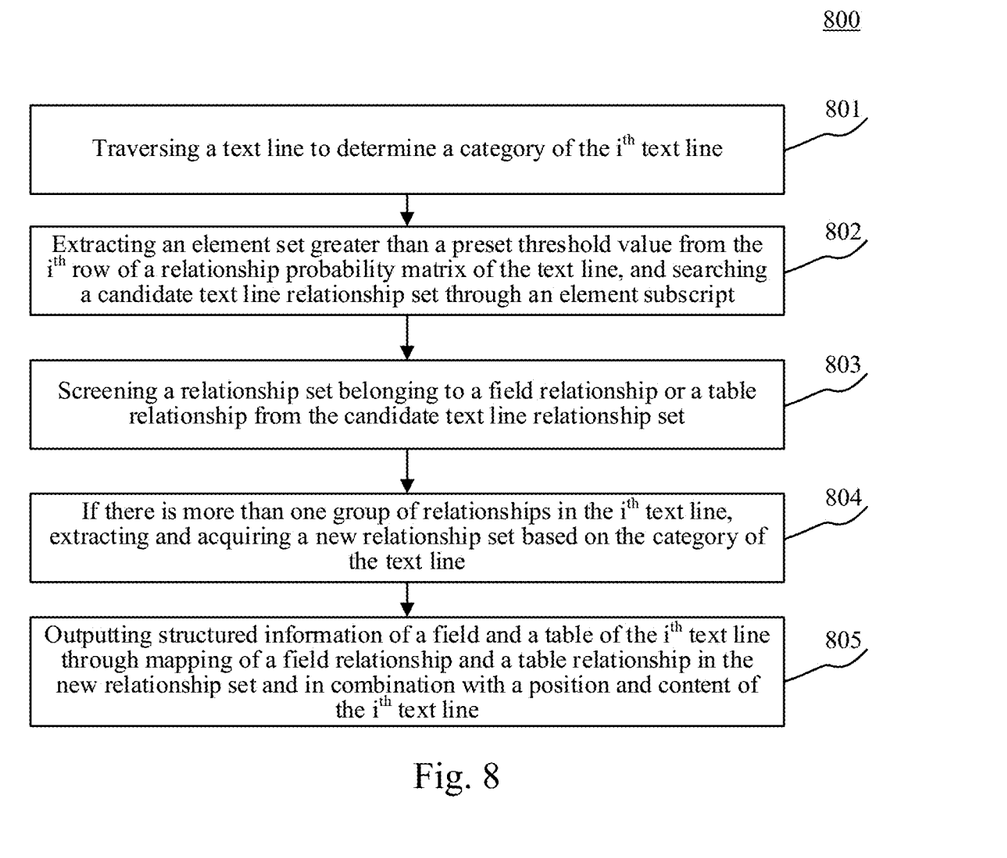
FIG. 8 is an exploded flow diagram of a structured information construction step in FIG. 2.

Further referring to FIG. 8, FIG. 8 illustrates an exploded flow 800 of the structured information construction step in FIG. 2. The structured information construction step may be exploded as follows.

Step 801, traversing a text line to determine a category of the i$^{th}$ text line.

In this embodiment, the executing body may traverse the text line V', to determine the category of the i$^{th}$ text line.

Step 802, extracting an element set greater than a preset threshold value from the i$^{th}$ row of a relationship probability matrix of the text line, and searching a candidate text line relationship set through an element subscript.

In this embodiment, the executing body may preset a threshold value t, where t∈(0,1). Then, the above executing body may extract the element set $\{A'_{ij}\}$ greater than the preset threshold value t from the i$^{th}$ row of the relationship probability matrix A' of the text line, and search the candidate text line relationship set $\{(v_i, v_j)\}$ through the element subscript.

Step 803, screening a relationship set belonging to a field relationship or a table relationship from the candidate text line relationship set.

In this embodiment, the executing body may first determine the union set (R∪M) of the field relationship R or the table relationship M, and then screen the relationship set (R', M') belonging to (R∪M) from the candidate text line relationship set $\{(v_i, v_j)\}$.

Step 804, if there is more than one group of relationships in the i$^{th}$ text line, extracting a new relationship set based on the category of the text line.

In this embodiment, if there is more than one group of relationships in the i$^{th}$ text line, the executing body may extract the new relationship set (R", M") based on the category of the text line.

In some embodiments, if the i$^{th}$ text line $v_i$ belongs to the union set of an attribute K of a field, a value V of the field and a cell C of a table, that is, $v_i \in (K \cup V \cup C)$, a text line corresponding to an element having a maximum probability value in the i$^{th}$ row $\{A'_{i\cdot}\}$ of the relationship probability matrix A' of the text line is selected to represent a corresponding relationship with the i$^{th}$ text line. If the i$^{th}$ text line $v_i$ belongs to the header H of the table, that is, $v_i \in H$, all elements $\{A'_{i.}\}$ of the relationship set are reserved to represent a corresponding relationship with the $i^{th}$ text line. The new relationship set may be generated by updating the text line and the relationship in the relationship set.

Step 805, outputting structured information of a field and a table of the $i^{th}$ text line through mapping of a field relationship and a table relationship in the new relationship set and in combination with a position and content of the $i^{th}$ text line.

In this embodiment, the executing body may output the structured information of the field and the table of the $i^{th}$ text line through the mapping of the field relationship R" and the table relationship M" in the new relationship set (R", M") and in combination with the position and the content of the $i^{th}$ text line.

According to the structured information construction method provided in the embodiment of the present disclosure, the text line is first traversed to determine the category of the $i^{th}$ text line. Then, the element set greater than the preset threshold value is extracted from the $i^{th}$ row of the relationship probability matrix of the text line, and the candidate text line relationship set is searched through the element subscript. Next, the relationship set belonging to the field relationship or the table relationship is screened from the candidate text line relationship set, and if there is more than one group of relationships in the $i^{th}$ text line, the new relationship set is acquired based on the relationship set. Finally, the structured information of the field and the table of the $i^{th}$ text line is outputted through the mapping of the field relationship and the table relationship in the new relationship set and in combination with the position and the content of the $i^{th}$ text line. The method for performing a structured extraction on a text performed based on the category and relationship reasoning has a wide application range and a strong versatility.

Figure 9:
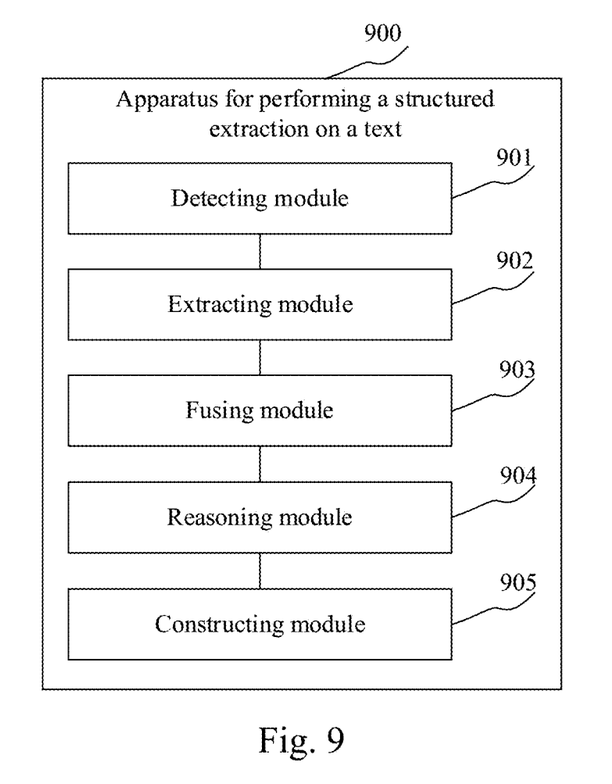
FIG. 9 is a schematic structural diagram of an apparatus for performing a structured extraction on a text according to an embodiment of the present disclosure.

Further referring to FIG. 9, as an implementation of the method shown in the above drawings, the present disclosure provides an embodiment of an apparatus for performing a structured extraction on a text. The embodiment of the apparatus corresponds to the embodiment of the method shown in FIG. 2, and the apparatus may be specifically applied to various electronic devices.

As shown in FIG. 9, the apparatus 900 for performing a structured extraction on a text in this embodiment may include: a detecting module 901, an extracting module 902, a fusing module 903, a reasoning module 904 and a constructing module 905. Here, the detecting module 901 is configured to perform a text detection on an entity text image to obtain a position and content of a text line of the entity text image. The extracting module 902 is configured to extract multivariate information of the text line based on the position and the content of the text line. The fusing module 903 is configured to perform a feature fusion on the multivariate information of the text line to obtain a multimodal fusion feature of the text line. The reasoning module 904 is configured to perform category and relationship reasoning based on the multimodal fusion feature of the text line to obtain a category and a relationship probability matrix of the text line. The constructing module 905 is configured to construct structured information of the entity text image based on the category and the relationship probability matrix of the text line.

In this embodiment, for specific processes of the detecting module 901, the extracting module 902, the fusing module 903, the reasoning module 904 and the constructing module 905 in the apparatus 900 for performing a structured extraction on a text, and their technical effects, reference may be made to relative descriptions of steps 201-205 in the corresponding embodiment of FIG. 2 respectively, which will not be repeatedly described here.

In some alternative implementations of this embodiment, the detecting module 901 is further configured to: input the entity text image into a scene text detection model, and output coordinates of four corner points of the text line; perform an affine transformation on the coordinates of the four corner points of the text line, to generate coordinates of four corner points of a positive rectangle of the text line; cut out an image slice of the text line in the entity text image based on the coordinates of the four corner points of the positive rectangle of the text line; and input the image slice of the text line into a recurrent convolutional neural network, and output the content of the text line.

In some alternative implementations of this embodiment, the extracting module 902 includes: a determining sub-module, configured to determine an input triple of the text line and an input triple of a relationship between any two text lines based on the position and the content of the text line, the input triple of the text line including the coordinates of the four corner points, the content and the image slice of the text line, and the input triple of the relationship between the any two text lines including a difference value between coordinates of four corner points of the any two text lines, an angle difference between center points of the any two text lines, and an Euclidean distance between the center points of the any two text lines; and an extracting sub-module, configured to use the input triple of the text line and the input triple of the relationship between the any two text lines as an input of a multimodal feature extraction algorithm to extract the multivariate information of the text line.

In some alternative implementations of this embodiment, the extracting sub-module is further configured to: determine the coordinates of the four corner points of the text line as a geometric feature of the text line; input the entity text image into a convolutional neural network and output a visual two-dimensional feature map: calculate a region of the text line on the visual two-dimensional feature map based on the coordinates of the four corner points of the text line, and clip a visual feature of the text line using a region-of-interest coordinate transform operation; and input the content of the text line into a pre-trained model to perform a semantic information extraction, to obtain a semantic feature of the text line.

In some alternative implementations of this embodiment, the fusing module 903 is further configured to: perform multimodal stitching and fusion on the geometric feature, the visual feature and the semantic feature of the text line, to generate a multimodal feature of the text line; and for a combination of the any two text lines, stitch multimodal features corresponding to the text lines and the input triple of the relationship between the any two text lines, to generate a relationship feature of the any two text lines.

In some alternative implementations of this embodiment, the reasoning module 904 includes: an outputting sub-module, configured to input the multimodal feature of the text line and the relationship feature of the any two text lines into a graph neural network and output the category and the relationship probability matrix of the text line.

In some alternative implementations of this embodiment, the graph neural network includes N graph neural network layers, and N is a positive integer. The outputting sub-module includes: an outputting unit, configured to, for an $l^{th}$ layer of the graph neural network, input a multimodal feature of the text line and a relationship feature of the any two text lines that are outputted from an $(l-1)^{th}$ layer into the $l^{th}$ layer to obtain a multimodal feature of the text line and a relationship feature of the any two text lines that are outputted from the $l^{th}$ layer, wherein $1 \leq l < N$, and 1 is a positive integer.

In some alternative implementations of this embodiment, the outputting unit is further configured to: input the relationship feature of the any two text lines that is outputted from the $(l-1)^{th}$ layer into a multilayer perceptron model, to obtain a relationship probability matrix outputted from the $l^{th}$ layer: multiply the multimodal feature of the text line that is outputted from the $(l-1)^{th}$ layer by the relationship probability matrix outputted from the $l^{th}$ layer, and perform a feature aggregation on the text line and a text line associated with the text line according to a probability distribution of the relationship probability matrix outputted from the $l^{th}$ layer, to obtain a multimodal feature of the text line that is hidden at the $l^{th}$ layer: multiply the multimodal feature of the text line that is hidden at the $l^{th}$ layer and the relationship feature of the any two text lines that is outputted from the $(l-1)^{th}$ layer by a transpose of the multimodal feature of the text line that is hidden at the $l^{th}$ layer, and obtain, through the multilayer perceptron model, the relationship feature of the any two text lines that is outputted from the $l^{th}$ layer; and use a single-layer gated recurrent unit to update the multimodal feature of the text line that is hidden at the $l^{th}$ layer to the multimodal feature of the text line that is outputted from the $(l-1)^{th}$ layer, to obtain the multimodal feature of the text line that is outputted from the $l^{th}$ layer.

In some alternative implementations of this embodiment, in response to that $l=N$, the category and the relationship probability matrix of the text line are outputted from the $l^{th}$ layer.

In some alternative implementations of this embodiment, the constructing module 905 includes: a traversing sub-module, configured to traverse the text line to determine a category of an $i^{th}$ text line, wherein i is a positive integer: a searching sub-module, configured to extract an element set greater than a preset threshold value from an $i^{th}$ row of the relationship probability matrix of the text line, and search a candidate text line relationship set through an element subscript: a screening sub-module, configured to screen a relationship set belonging to a field relationship or a table relationship from the candidate text line relationship set: an acquiring sub-module, configured to, in response to that there is more than one group of relationships in the $i^{th}$ text line, extract a new relationship set based on the category of the text line; and a mapping sub-module, configured to output structured information of a field and a table of the $i^{th}$ text line through mapping of a field relationship and a table relationship in the new relationship set and in combination with a position and content of the $i^{th}$ text line.

In some alternative implementations of this embodiment, the acquiring sub-module is further configured to: in response to that the $i^{th}$ text line belongs to a union set of an attribute of the field, a value of the field and a cell of the table, select a text line corresponding to an element having a maximum probability value in the $i^{th}$ row of the relationship probability matrix of the text line to represent a corresponding relationship with the $i^{th}$ text line; in response to that the $i^{th}$ text line belongs to a header of the table, reserve a text line corresponding to all elements in the relationship set to represent a corresponding relationship with the $i^{th}$ text line; and generate the new relationship set based on the corresponding relationship.

In some alternative implementations of this embodiment, the category of the text line includes at least one of an attribute of a field, a value of the field, a header of a table or a cell of the table. The attribute and the value of the field represents a field corresponding relationship, the header and the cell of the table represents a table corresponding relationship, the text line represents a vertex of an undirected graph, the field corresponding relationship and the table corresponding relationship represent an edge of the undirected graph, and the relationship probability matrix is constructed based on the edge of the undirected graph to represent whether there is a relationship between corresponding vertices.

According to embodiments of the present disclosure, the present disclosure further provides an electronic device and a readable storage medium.

Figure 10:
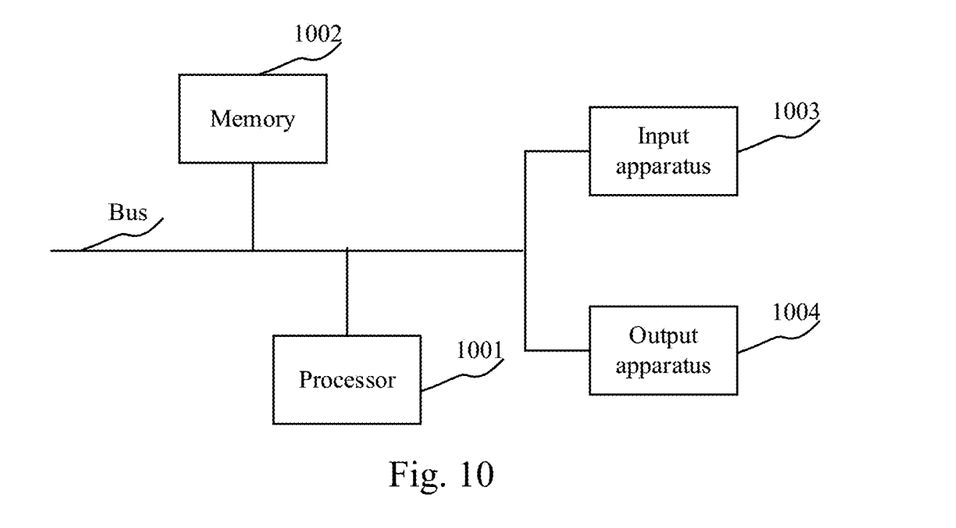
FIG. 10 is a block diagram of an electronic device adapted to implement a method for performing a structured extraction on a text according to embodiments of the present disclosure.

As shown in FIG. 10, FIG. 10 is a block diagram of an electronic device of a method for performing a structured extraction on a text according to embodiments of the present disclosure. The electronic device is intended to represent various forms of digital computers such as a laptop computer, a desktop computer, a workstation, a personal digital assistant, a server, a blade server, a mainframe computer, and other appropriate computers. The electronic device may also represent various forms of mobile apparatuses such as personal digital processing, a cellular telephone, a smart phone, a wearable device and other similar computing apparatuses. The parts shown herein, their connections and relationships, and their functions are only as examples, and not intended to limit implementations of the present disclosure as described and/or claimed herein.

As shown in FIG. 10, the electronic device includes: one or more processors 1001, a memory 1002, and interfaces for connecting various components, including high-speed interfaces and low-speed interfaces. The various components are connected to each other using different buses, and may be installed on a common motherboard or in other methods as needed. The processor may process instructions executed within the electronic device, including instructions stored in or on the memory to display graphic information of GUI on an external input/output apparatus (such as a display device coupled to the interface). In other embodiments, a plurality of processors and/or a plurality of buses may be used together with a plurality of memories if desired. Similarly, a plurality of electronic devices may be connected, and the devices provide some necessary operations (for example, as a server array, a set of blade servers, or a multi-processor system). In FIG. 10, one processor 1001 is used as an example.

The memory 1002 is a non-transitory computer readable storage medium provided by the present disclosure. The memory stores instructions executable by at least one processor, so that the at least one processor performs the method for performing a structured extraction on a text provided by the present disclosure. The non-transitory computer readable storage medium of the present disclosure stores computer instructions for causing a computer to perform the method for performing a structured extraction on a text provided by the present disclosure.

The memory 1002, as a non-transitory computer readable storage medium, may be used to store non-transitory software programs, non-transitory computer executable programs and modules, such as program instructions/modules corresponding to the method for performing a structured extraction on a text in the embodiments of the present disclosure (for example, the detecting module 901, the extracting module 902, and the fusing module 903, the reasoning module 904, and the constructing module 905 shown in FIG. 9). The processor 1001 executes the non-transitory software programs, instructions, and modules stored in the memory 1002 to execute various functional applications and data processing of the server, that is, to implement the method for performing a structured extraction on a text in the foregoing method embodiment.

The memory 1002 may include a storage program area and a storage data area, where the storage program area may store an operating system and at least one function required application program; and the storage data area may store data created by the use of the electronic device according to the method for performing a structured extraction on a text, etc. In addition, the memory 1002 may include a high-speed random access memory, and may also include a non-transitory memory, such as at least one magnetic disk storage device, a flash memory device, or other non-transitory solid-state storage devices. In some embodiments, the memory 1002 may optionally include memories remotely provided with respect to the processor 1001, and these remote memories may be connected to the electronic device of the method for performing a structured extraction on a text through a network. Examples of the above network include but are not limited to the Internet, intranet, local area network, mobile communication network, and combinations thereof.

The electronic device of the method for performing a structured extraction on a text may further include: an input apparatus 1003 and an output apparatus 1004. The processor 1001, the memory 1002, the input apparatus 1003, and the output apparatus 1004 may be connected through a bus or in other methods. In FIG. 10, connection through a bus is used as an example.

The input apparatus 1003 may receive input digital or character information, and generate key signal inputs related to user settings and function control of the electronic device of the method for performing a structured extraction on a text, such as touch screen, keypad, mouse, trackpad, touchpad, pointing stick, one or more mouse buttons, trackball, joystick and other input apparatuses. The output apparatus 1004 may include a display device, an auxiliary lighting apparatus (for example, LED), a tactile feedback apparatus (for example, a vibration motor), and the like. The display device may include, but is not limited to, a liquid crystal display (LCD), a light emitting diode (LED) display, and a plasma display. In some embodiments, the display device may be a touch screen.

Various embodiments of the systems and technologies described herein may be implemented in digital electronic circuit systems, integrated circuit systems, dedicated ASICs (application specific integrated circuits), computer hardware, firmware, software, and/or combinations thereof. These various embodiments may include: being implemented in one or more computer programs that can be executed and/or interpreted on a programmable system that includes at least one programmable processor. The programmable processor may be a dedicated or general-purpose programmable processor, and may receive data and instructions from a storage system, at least one input apparatus, and at least one output apparatus, and transmit the data and instructions to the storage system, the at least one input apparatus, and the at least one output apparatus.

These computing programs (also referred to as programs, software, software applications, or codes) include machine instructions of the programmable processor and may use high-level processes and/or object-oriented programming languages, and/or assembly/machine languages to implement these computing programs. As used herein, the terms "machine readable medium" and "computer readable medium" refer to any computer program product, device, and/or apparatus (for example, magnetic disk, optical disk, memory, programmable logic apparatus (PLD)) used to provide machine instructions and/or data to the programmable processor, including machine readable medium that receives machine instructions as machine readable signals. The term "machine readable signal" refers to any signal used to provide machine instructions and/or data to the programmable processor.

In order to provide interaction with a user, the systems and technologies described herein may be implemented on a computer, the computer has: a display apparatus for displaying information to the user (for example, CRT (cathode ray tube) or LCD (liquid crystal display) monitor); and a keyboard and a pointing apparatus (for example, mouse or trackball), and the user may use the keyboard and the pointing apparatus to provide input to the computer. Other types of apparatuses may also be used to provide interaction with the user: for example, feedback provided to the user may be any form of sensory feedback (for example, visual feedback, auditory feedback, or tactile feedback); and any form (including acoustic input, voice input, or tactile input) may be used to receive input from the user.

The systems and technologies described herein may be implemented in a computing system that includes backend components (e.g., as a data server), or a computing system that includes middleware components (e.g., application server), or a computing system that includes frontend components (for example, a user computer having a graphical user interface or a web browser, through which the user may interact with the implementations of the systems and the technologies described herein), or a computing system that includes any combination of such backend components, middleware components, or frontend components. The components of the system may be interconnected by any form or medium of digital data communication (e.g., communication network). Examples of the communication network include: local area networks (LAN), wide area networks (WAN), the Internet, and blockchain networks.

The computer system may include a client and a server. The client and the server are generally far from each other and usually interact through the communication network. The relationship between the client and the server is generated by computer programs that run on the corresponding computer and have a client-server relationship with each other.

According to the technical solution of the present disclosure, the text detection is first performed on the entity text image to obtain the position and the content of the text line of the entity text image. Then, the multivariate information of the text line is extracted based on the position and the content of the text line. Next, the feature fusion is performed on the multivariate information of the text line to obtain the multimodal fusion feature of the text line. Afterward, the category and relationship reasoning is performed based on the multimodal fusion feature of the text line to obtain the category and the relationship probability matrix of the text line. Finally, the structured information of the entity text image is constructed based on the category and the relationship probability matrix of the text line. The method for performing a structured extraction on a text based on relationship reasoning is provided, which is suitable for large-scale and automated processing and has a wide application range and a strong versatility.

It should be understood that the various forms of processes shown above may be used to reorder, add, or delete steps. For example, the steps described in the present disclosure may be performed in parallel, sequentially, or in different orders. As long as the desired results of the technical solution disclosed in the present disclosure can be achieved, no limitation is made herein.

The above specific embodiments do not constitute limitation on the protection scope of the present disclosure. Those skilled in the art should understand that various modifications, combinations, sub-combinations and substitutions may be made according to design requirements and other factors. Any modification, equivalent replacement and improvement made within the spirit and principle of the present disclosure shall be included in the protection scope of the present disclosure.

What is claimed is:

1. A method for performing a structured extraction on a text, comprising:
    performing a text detection on an entity text image to obtain a position and content of a text line of the entity text image;
    extracting multivariate information of the text line based on the position and the content of the text line;
    performing a feature fusion on the multivariate information of the text line to obtain a multimodal fusion feature of the text line;
    performing, by a graph neural network, category and relationship reasoning based on the multimodal fusion feature of the text line to obtain a category and a relationship probability matrix of the text line; and
    constructing structured information of the entity text image based on the category and the relationship probability matrix of the text line,
    wherein the graph neural network comprises N graph neural network layers, N is a positive integer, wherein performing the category and relationship reasoning based on the multimodal fusion feature of the text line to obtain the category and the relationship probability matrix of the text line comprises:
    inputting a relationship feature of any two text lines that are outputted from an $(l-1)^{th}$ layer into a multilayer perceptron model, to obtain a relationship probability matrix outputted from an $l^{th}$ layer;
        multiplying a multimodal feature of the text line that is outputted from the $(l-1)^{th}$ layer by the relationship probability matrix outputted from the $l^{th}$ layer, and performing a feature aggregation on the text line and a text line associated with the text line according to a probability distribution of the relationship probability matrix outputted from the $l^{th}$ layer, to obtain a multimodal feature of the text line that is hidden at the $l^{th}$ layer;
        multiplying the multimodal feature of the text line that is hidden at the $l^{th}$ layer and the relationship feature of the any two text lines that is outputted from the $(l-1)^{th}$ layer by a transpose of the multimodal feature of the text line that is hidden at the $l^{th}$ layer, and obtaining, through the multilayer perceptron model, the relationship feature of the any two text lines that is outputted from the $l^{th}$ layer; and
        using a single-layer gated recurrent unit to update the multimodal feature of the text line that is hidden at the $l^{th}$ layer to the multimodal feature of the text line that is outputted from the $(l-1)^{th}$ layer, to obtain the multimodal feature of the text line that is outputted from the $l^{th}$ layer,
    wherein a multimodal feature of a text line is obtained by performing multimodal stitching and fusion on a geometric feature, a visual feature and a semantic feature of the text line.

2. The method according to claim 1, wherein performing the text detection on the entity text image to obtain the position and the content of the text line of the entity text image comprises:
    inputting the entity text image into a scene text detection model, and outputting coordinates of four corner points of the text line;
    performing an affine transformation on the coordinates of the four corner points of the text line, to generate coordinates of four corner points of a positive rectangle of the text line;
    cutting out an image slice of the text line in the entity text image based on the coordinates of the four corner points of the positive rectangle of the text line; and
    inputting the image slice of the text line into a recurrent convolutional neural network, and outputting the content of the text line.

3. The method according to claim 2, wherein extracting the multivariate information of the text line based on the position and the content of the text line comprises:
    determining an input triple of the text line and an input triple of a relationship between any two text lines based on the position and the content of the text line, the input triple of the text line including the coordinates of the four corner points, the content and the image slice of the text line, and the input triple of the relationship between the any two text lines including a difference value between coordinates of four corner points of the any two text lines, an angle difference between center points of the any two text lines, and an Euclidean distance between the center points of the any two text lines; and
    using the input triple of the text line and the input triple of the relationship between the any two text lines as an input of a multimodal feature extraction algorithm to extract the multivariate information of the text line.

4. The method according to claim 3, wherein the using the input triple of the text line and the input triple of the relationship between the any two text lines as the input of the multimodal feature extraction algorithm to extract the multivariate information of the text line comprises:
    determining the coordinates of the four corner points of the text line as the geometric feature of the text line;
    inputting the entity text image into a convolutional neural network and outputting a visual two-dimensional feature map;
    calculating a region of the text line on the visual two-dimensional feature map based on the coordinates of the four corner points of the text line, and clipping the visual feature of the text line using a region-of-interest coordinate transform operation; and
    inputting the content of the text line into a pre-trained model to perform a semantic information extraction, to obtain the semantic feature of the text line.

5. The method according to claim 4, wherein performing the feature fusion on the multivariate information of the text line to obtain the multimodal fusion feature of the text line comprises:
    performing the multimodal stitching and fusion on the geometric feature, the visual feature and the semantic feature of the text line, to generate the multimodal feature of the text line; and for a combination of the any two text lines, stitching multimodal features corresponding to the text lines and the input triple of the relationship between the any two text lines, to generate a relationship feature of the any two text lines.

6. The method according to claim 1, wherein in response to that l=N, the category and the relationship probability matrix of the text line are outputted from the $l^{th}$ layer.

7. The method according to claim 1, wherein constructing the structured information of the entity text image based on the category and the relationship probability matrix of the text line comprises:
traversing the text line to determine a category of an $i^{th}$ text line, wherein i is a positive integer;
extracting an element set greater than a preset threshold value from an $i^{th}$ row of the relationship probability matrix of the text line, and searching a candidate text line relationship set through an element subscript;
screening a relationship set belonging to a field relationship or a table relationship from the candidate text line relationship set;
in response to that there is more than one group of relationships in the $i^{th}$ text line, extracting a new relationship set based on the category of the text line; and
outputting structured information of a field and a table of the $i^{th}$ text line through mapping of a field relationship and a table relationship in the new relationship set and in combination with a position and content of the $i^{th}$ text line.

8. The method according to claim 7, wherein acquiring the new relationship set based on the relationship set comprises:
in response to that the $i^{th}$ text line belongs to a union set of an attribute of the field, a value of the field and a cell of the table, selecting a text line corresponding to an element having a maximum probability value in the $i^{th}$ row of the relationship probability matrix of the text line to represent a corresponding relationship with the $i^{th}$ text line;
in response to that the $i^{th}$ text line belongs to a header of the table, reserving a text line corresponding to all elements in the relationship set to represent a corresponding relationship with the $i^{th}$ text line; and
generating the new relationship set based on the corresponding relationship.

9. The method according to claim 1, wherein the category of the text line comprises at least one of: an attribute of a field, a value of the field, a header of a table, or a cell of the table, and wherein the attribute and the value of the field represents a field corresponding relationship, the header and the cell of the table represents a table corresponding relationship, the text line represents a vertex of an undirected graph, the field corresponding relationship and the table corresponding relationship represent an edge of the undirected graph, and the relationship probability matrix is constructed based on the edge of the undirected graph to represent whether there is a relationship between corresponding vertices.

10. An electronic device, comprising:
at least one processor; and
a memory communicated with the at least one processor, wherein the memory stores instructions executable by the at least one processor that, when executed by the at least one processor, causes the at least one processor to perform operations comprising:
performing a text detection on an entity text image to obtain a position and content of a text line of the entity text image;
extracting multivariate information of the text line based on the position and the content of the text line;
performing, by a graph neural network, a feature fusion on the multivariate information of the text line to obtain a multimodal fusion feature of the text line;
performing category and relationship reasoning based on the multimodal fusion feature of the text line to obtain a category and a relationship probability matrix of the text line; and
constructing structured information of the entity text image based on the category and the relationship probability matrix of the text line,
wherein the graph neural network comprises N graph neural network layers, N is a positive integer, wherein performing the category and relationship reasoning based on the multimodal fusion feature of the text line to obtain a category and a relationship probability matrix of the text line, comprises:
inputting a relationship feature of any two text lines that are outputted from an $(l-1)^{th}$ layer into a multilayer perceptron model, to obtain a relationship probability matrix outputted from an $l^{th}$ layer;
multiplying a multimodal feature of the text line that is outputted from the $(l-1)^{th}$ layer by the relationship probability matrix outputted from the $l^{th}$ layer, and performing a feature aggregation on the text line and a text line associated with the text line according to a probability distribution of the relationship probability matrix outputted from the $l^{th}$ layer, to obtain a multimodal feature of the text line that is hidden at the $l^{th}$ layer;
multiplying the multimodal feature of the text line that is hidden at the $l^{th}$ layer and the relationship feature of the any two text lines that is outputted from the $(l-1)^{th}$ layer by a transpose of the multimodal feature of the text line that is hidden at the $l^{th}$ layer, and obtaining, through the multilayer perceptron model, the relationship feature of the any two text lines that is outputted from the $l^{th}$ layer; and
using a single-layer gated recurrent unit to update the multimodal feature of the text line that is hidden at the $l^{th}$ layer to the multimodal feature of the text line that is outputted from the $(l-1)^{th}$ layer, to obtain the multimodal feature of the text line that is outputted from the $l^{th}$ layer,
wherein a multimodal feature of a text line is obtained by performing multimodal stitching and fusion on a geometric feature, a visual feature and a semantic feature of the text line.

11. The electronic device according to claim 10, wherein performing the text detection on the entity text image to obtain the position and the content of the text line of the entity text image comprises:
inputting the entity text image into a scene text detection model, and outputting coordinates of four corner points of the text line;
performing an affine transformation on the coordinates of the four corner points of the text line, to generate coordinates of four corner points of a positive rectangle of the text line;
cutting out an image slice of the text line in the entity text image based on the coordinates of the four corner points of the positive rectangle of the text line; and inputting the image slice of the text line into a recurrent convolutional neural network, and outputting the content of the text line.

12. The electronic device according to claim 11, wherein extracting the multivariate information of the text line based on the position and the content of the text line comprises:
   determining an input triple of the text line and an input triple of a relationship between any two text lines based on the position and the content of the text line, the input triple of the text line including the coordinates of the four corner points, the content and the image slice of the text line, and the input triple of the relationship between the any two text lines including a difference value between coordinates of four corner points of the any two text lines, an angle difference between center points of the any two text lines, and an Euclidean distance between the center points of the any two text lines; and
   using the input triple of the text line and the input triple of the relationship between the any two text lines as an input of a multimodal feature extraction algorithm to extract the multivariate information of the text line.

13. The electronic device according to claim 12, wherein the using the input triple of the text line and the input triple of the relationship between the any two text lines as the input of the multimodal feature extraction algorithm to extract the multivariate information of the text line comprises:
   determining the coordinates of the four corner points of the text line as a geometric feature of the text line;
   inputting the entity text image into a convolutional neural network and outputting a visual two-dimensional feature map;
   calculating a region of the text line on the visual two-dimensional feature map based on the coordinates of the four corner points of the text line, and clipping a visual feature of the text line using a region-of-interest coordinate transform operation; and
   inputting the content of the text line into a pre-trained model to perform a semantic information extraction, to obtain the semantic feature of the text line.

14. The electronic device according to claim 13, wherein performing the feature fusion on the multivariate information of the text line to obtain the multimodal fusion feature of the text line comprises:
   performing the multimodal stitching and fusion on the geometric feature, the visual feature and the semantic feature of the text line, to generate the multimodal feature of the text line; and
   for a combination of the any two text lines, stitching multimodal features corresponding to the text lines and the input triple of the relationship between the any two text lines, to generate a relationship feature of the any two text lines.

15. A non-transitory computer readable storage medium, storing a computer instruction, wherein the computer instruction is used to cause a computer to perform operations, comprising:
   performing a text detection on an entity text image to obtain a position and content of a text line of the entity text image;
   extracting multivariate information of the text line based on the position and the content of the text line;
   performing a feature fusion on the multivariate information of the text line to obtain a multimodal fusion feature of the text line;
   performing, by a graph neural network, category and relationship reasoning based on the multimodal fusion feature of the text line to obtain a category and a relationship probability matrix of the text line; and
   constructing structured information of the entity text image based on the category and the relationship probability matrix of the text line,
   wherein the graph neural network comprises N graph neural network layers, N is a positive integer, wherein performing the category and relationship reasoning based on the multimodal fusion feature of the text line to obtain a category and a relationship probability matrix of the text line, comprises:
      inputting a relationship feature of any two text lines that are outputted from an $(l-1)^{th}$ layer into a multilayer perceptron model, to obtain a relationship probability matrix outputted from an $l^{th}$ layer;
      multiplying a multimodal feature of the text line that is outputted from the $(l-1)^{th}$ layer by the relationship probability matrix outputted from the $l^{th}$ layer, and performing a feature aggregation on the text line and a text line associated with the text line according to a probability distribution of the relationship probability matrix outputted from the $l^{th}$ layer, to obtain a multimodal feature of the text line that is hidden at the $l^{th}$ layer;
      multiplying the multimodal feature of the text line that is hidden at the $l^{th}$ layer and the relationship feature of the any two text lines that is outputted from the $(l-1)^{th}$ layer by a transpose of the multimodal feature of the text line that is hidden at the $l^{th}$ layer, and obtaining, through the multilayer perceptron model, the relationship feature of the any two text lines that is outputted from the $l^{th}$ layer; and
      using a single-layer gated recurrent unit to update the multimodal feature of the text line that is hidden at the $l^{th}$ layer to the multimodal feature of the text line that is outputted from the $(l-1)^{th}$ layer, to obtain the multimodal feature of the text line that is outputted from the $l^{th}$ layer,
   wherein a multimodal feature of a text line is obtained by performing multimodal stitching and fusion on a geometric feature, a visual feature and a semantic feature of the text line.

* * * * *